US008176616B2

(12) United States Patent
Stevenson et al.

(10) Patent No.: US 8,176,616 B2
(45) Date of Patent: May 15, 2012

(54) METHOD FOR ERROR-PROOFING A RECONFIGURABLE CLAMP

(75) Inventors: Robin Stevenson, Bloomfield, MI (US); Ivan G. Sears, Rochester Hills, MI (US); Richard J. Skurkis, Lake Orion, MI (US); Jeff Dellach, Shelby Township, MI (US); Mike Vainstein, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 402 days.

(21) Appl. No.: 12/344,613

(22) Filed: Dec. 29, 2008

(65) Prior Publication Data

US 2010/0164160 A1    Jul. 1, 2010

(51) Int. Cl.
*B23Q 7/00* (2006.01)
*B23Q 3/08* (2006.01)
*B25B 1/24* (2006.01)
*B25B 5/16* (2006.01)

(52) U.S. Cl. .............................. 29/559; 269/266; 269/32

(58) Field of Classification Search ................. 29/559; 269/24, 53, 54.1, 54.3, 54.5, 43.2, 41, 43, 269/46, 59, 266, 32
See application file for complete search history.

(56) References Cited

U.S. PATENT DOCUMENTS

| 4,646,419 | A | * | 3/1987 | Glessner et al. ............... 29/559 |
| 5,875,417 | A | * | 2/1999 | Golden ......................... 702/150 |
| RE39,786 | E | * | 8/2007 | Dellach ...................... 403/322.3 |
| 2005/0269757 | A1 * | | 12/2005 | Stevenson et al. ............. 269/266 |
| 2007/0196719 | A1 * | | 8/2007 | Hill et al. ....................... 429/37 |

* cited by examiner

*Primary Examiner* — Lee D Wilson
*Assistant Examiner* — Seahee Yoon
(74) *Attorney, Agent, or Firm* — Quinn Law Group, PLLC

(57) ABSTRACT

A method for error-proofing clamping operation performed with a reconfigurable clamp having a body, a locking member, a plurality of moveable pins for contacting an object, and a plunger is provided. The method includes applying a force to the plunger and sensing whether the plunger achieves a fully-depressed position, and releasing the force to the plunger and sensing whether the plunger achieves a fully-extended position. The method may additionally include applying the force to the plunger, contacting the object with the plurality of pins and sensing whether the clamp body achieves a predetermined position relative to a clamping device.

9 Claims, 6 Drawing Sheets

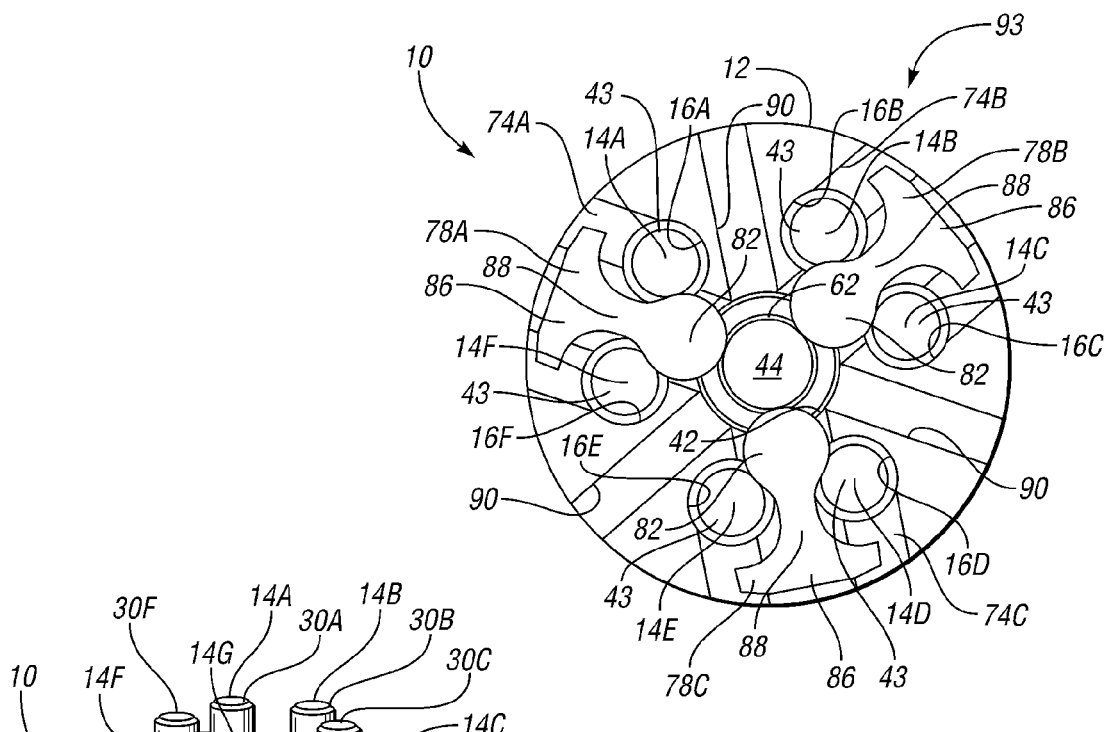
FIG. 2
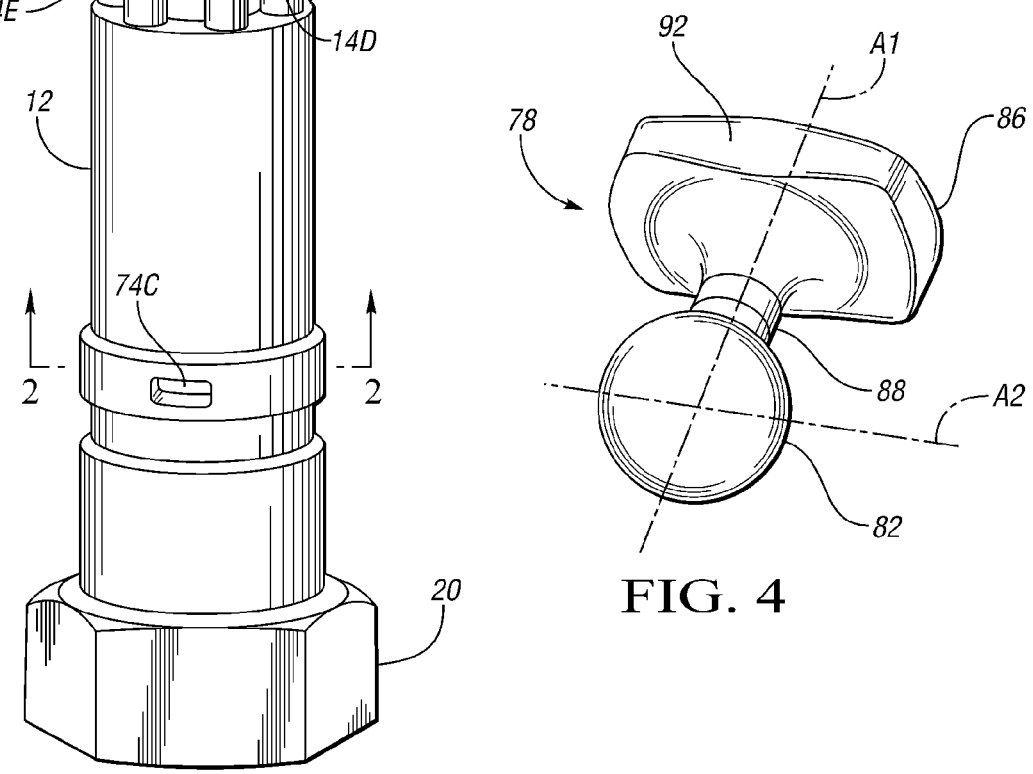
FIG. 1
FIG. 4

METHOD FOR ERROR-PROOFING A RECONFIGURABLE CLAMP

TECHNICAL FIELD

This invention relates to error-proofing reconfigurable locking clamps.

BACKGROUND OF THE INVENTION

Clamps are commonly used to position and temporarily support sheet metal panels during the fabrication and welding of vehicle bodies or body subassemblies. Some clamps are reconfigurable in order to support sheet metal panels of varied profiles.

Reconfigurable clamps may employ an internal mechanism to adjust the clamp to the contour of a specific body panel and lock the clamp in position. As employed in such reconfigurable clamps, internal locking mechanisms typically utilize precise construction and component fit, as well as relatively tight dimensional tolerances for secure support and accurate positioning of body panels.

SUMMARY OF THE INVENTION

During use, clamp mechanisms are subject to internal wear, which may generate abrasion particles. Additionally, due to being utilized in a manufacturing environment, such clamps may become exposed to foreign material, such as weld slag and other debris. Such foreign material, along with abrasion particles, may become lodged inside the clamp, cause the locking mechanism to experience jamming, and prevent automatic clamp adjustment.

Accordingly, a method is provided for error-proofing clamping operation performed with a reconfigurable clamp. The reconfigurable clamp is selectively operated for holding and releasing an object having a contour between the clamp and a clamping device. The clamp has a body, a locking member, a plurality of pins selectively moveable with respect to the body for contacting an object. The clamp also has a plunger selectively moveable with respect to the pins, with respect to the locking member, and with respect to the body between a fully-extended position and a fully-depressed position for urging the locking member against at least one of the pins. The method includes applying a force to the plunger and sensing whether the plunger achieves the fully-depressed position. The method additionally includes releasing the force applied to the plunger and sensing whether the plunger achieves the fully-extended position.

Furthermore, the method may further include reapplying the force to the plunger to thereby contact the object with the plurality of pins, and sensing whether the clamp body achieves a predetermined position relative to the clamping device. The clamping device may include a moveable arm, so that the predetermined position of the clamp body relative to the clamping device is determined with respect to a position of the moveable arm. The clamp may also be mounted on a moveable arm, and the predetermined position of the clamp body relative to the clamping device may be determined with respect to a position of the moveable arm.

The method may further include generating an error message and halting the clamp operation if: the plunger does not achieve the fully-depressed position; the plunger does not achieve the fully-extended position; or the clamp body does not achieve the predetermined position relative to the clamping device.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic, perspective view of a clamp assembly having a plurality of pins;

FIG. 2 is a schematic, cross-sectional bottom view of the clamp assembly of FIG. 1;

FIG. 4 is a schematic, perspective view of a locking member in the clamp assembly of FIG. 1;

DESCRIPTION OF THE PREFERRED EMBODIMENTS

Referring to FIGS. 1 and 2, a reconfigurable clamp 10 is schematically depicted. The clamp 10 includes a body 12, which, in the embodiment depicted, is generally cylindrical, but may be characterized by other shapes within the scope of the claimed invention. The clamp 10 also includes a plurality of pins 14A-F that are selectively movable with respect to the body 12. The clamp 10 also includes a pin 14G that is fixed with respect to the body 12. The body 12 defines a plurality of elongated bores 16A-F, each of which at least partially contains a respective one of the pins 14A-F.

Figure 3:
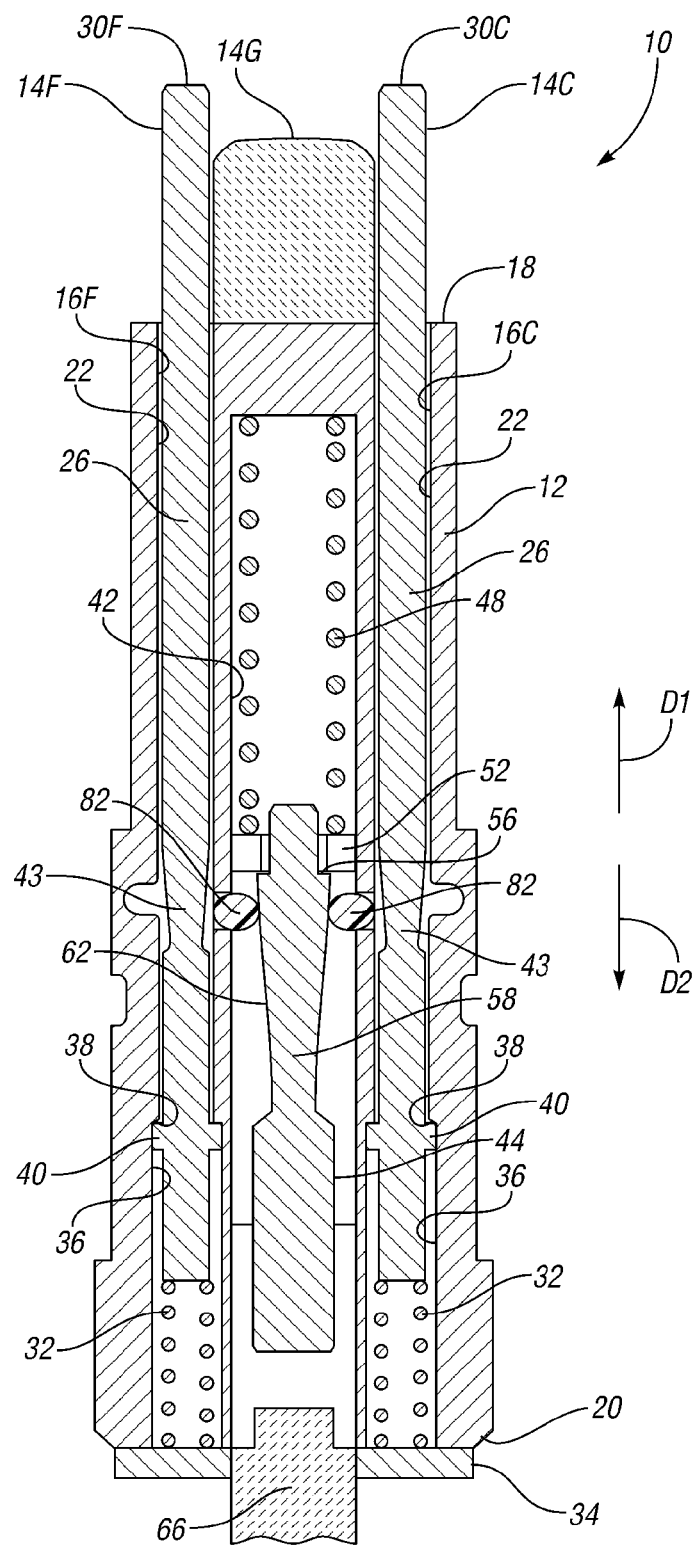
FIG. 3 is a schematic, longitudinal cross-sectional side view of the clamp assembly of FIG. 1.

FIG. 3 is a schematic, longitudinal cross-sectional view of the clamp 10, which depicts pins 14C, 14F and bores 16C, 16F. It should be noted that pins 14C, 14F are representative of all of the movable pins 14A-F, and that bores 16C, 16F are representative of all of bores 16A-F. The bores 16C, 16F extend through the body 12 from the tip 18 of the body 12 to the base 20 of the body 12. In the embodiment depicted, the pins 14C, 14F are generally cylindrical. The bores 16C, 16F are generally cylindrical. Each bore 16C, 16F is characterized by a respective portion 22 that has a uniform diameter. Each pin 14C, 14F is characterized by a respective segment 26 that has a uniform diameter and that is positioned within a respective one of portions 22. The diameter of portions 22 is slightly larger than the diameter of segments 26 so that the surfaces defining portions 22 restrict the movement of the pins 14C, 14F to substantially linear translation in either a first direction D1 or a second direction D2, which is opposite the first direction D1. As used herein, directions D1 and D2 are relative to the clamp 10. Each pin 14A-F is capable of individual motion in the first or second direction without inducing motion in any of the other pins 14A-F.

Referring again to FIG. 1, each pin 14A-F includes a respective end, or tip 30A-F. Each of the pins 14A-F in FIG. 1 is depicted in a respective extended position in which the tip of each pin is a predetermined distance outside the bores 16A-F and from the tip 18 of the body 12. Referring again to FIG. 3, a spring 32 is positioned within bore 16C between a base plate 34 and pin 14C and urges the pin 14C in the first direction D1 to its extended position. Similarly, a spring 32 is positioned within bore 16F between base plate 34 and pin 14F and urges the pin 14F in the first direction D1 to its extended position. Springs (not shown) identical to the springs shown at 32 are also in bores 16A, 16B, 16D, 16E between the base plate 34 and a respective one of pins 14A, 14B, 14D, 14E to bias the pins 14A, 14B, 14D, 14E in their respective extended positions.

Bore 16C includes a portion 36 having a diameter greater than the diameter of portion 22. A lip 38 is formed in the body 12 where portion 22 and portion 36 meet. Pin 14C includes a wide portion 40 that has a diameter greater than the diameter of portion 22, but less than the diameter of portion 36. Portion 40 of pin 14C is within portion 36 of bore 16C. Thus, section 36 of bore 16C is wide enough to accommodate translation of portion 40 therein. However, the lip 38 and the portion 40 are sufficiently positioned to contact each other when the pin 14C is in its extended position. Thus, the physical part interference between portion 40 and the lip 38 prevents movement of the pin 14C in the first direction D1 beyond the extended position. Each pin 14A-F also includes a respective tapered portion 43, which, in the embodiment depicted, decreases in diameter in the second direction D2.

The body 12 also defines a central bore 42, which, in the embodiment depicted, is cylindrical and has a common centerline with the body 12. In the embodiment depicted, the pins 14A-F and bores 16A-F are equidistant from the bore 42 and thus are arranged about a circle having the bore 42 at its center. An actuating member, i.e. plunger, 44 is located within the central bore 42. The plunger 44 is selectively movable in the first and second directions D1, D2. A spring 48 urges the plunger 44 in the second direction D2. More specifically, the spring 48 is within the bore 42 between a closed end of the bore 42 and a collar 52, and urges the collar 52 in the second direction D2. The collar 52 acts on a lip 56 formed on the plunger 44 and thereby transfers the force of the spring 48 to the plunger 44.

The plunger 44 is characterized by a tapered portion 58 that decreases in diameter in the second direction D2. The tapered portion 58 in the embodiment depicted is frustoconical, i.e., has the shape of a frustum of a cone. The tapered portion is characterized by outer surface 62.

The clamp 10 further includes a piston 66 that is configured to selectively contact the plunger 44 and to cause the plunger 44 to move in the first direction D1, against the force of spring 48. In the embodiment depicted, piston 66 is operatively connected to a pneumatic actuator, as shown at 70 in FIG. 5. Other devices or techniques of moving plunger 44 may be employed within the scope of the claimed invention. For example, the clamp 10 may include a servomotor or solenoid to move the plunger 44, the plunger 44 may be manually moved (such as via a mechanical linkage), etc.

Referring again to FIG. 2, the body 12 defines three lateral apertures, or bores 74A, 74B, 74C, each of which extends laterally from the outer surface of the clamp body 12 to the central bore 42. Each of the lateral bores 74A, 74B, 74C is also open to a respective two of the bores 16A-F such that two of the pins 14A-F are accessible from one of the lateral bores 74A, 74B, 74C. Thus, each bore 74A, 74B, 74C interconnects the central bore 42 and a two of the bores 16A-F.

More particularly, in the embodiment depicted, at least a portion of each of the lateral bores 74A, 74B, 74C is coextensive with a portion of two of the bores 16A-F. Portions of bore 74A are coextensive with portions of bores 16A and 16F. Portions of bore 74B are coextensive with portions of bores 16B and 16C. Portions of bore 74C are coextensive with bores 16D and 16E.

The clamp 10 also includes three locking members 78A, 78B, 78C. Each of the locking members 78A, 78B, 78C is at least partially located within a respective one of the bores 74A, 74B, 74C. Referring to FIG. 4, locking member 78 is representative of locking members 78A, 78B, 78C. Locking member 78 includes a substantially spherical portion 82 and a generally polygonal portion 86. In the embodiment depicted, the generally polygonal portion 86 has a form approximating that of a rectangular parallelepiped. The spherical portion 82 and the polygonal portion 86 are interconnected by a cylindrical or rod-like portion 88, one end of which terminates on the surface of the spherical portion 82 while the other end terminates on one face of the polygonal portion 86. As shown in FIG. 4, the portions 86, 88 may exhibit features such as chamfers and rounded corners to enable a smoother transition and blending of their individual geometries.

Referring again to FIG. 2, portion 82 of member 78A is between plunger 44 and pins 14A, 14F such that portion 82 of member 78A contacts surface 62 of the plunger 44 and the tapered portions 43 of pins 14A, 14F. Portion 88 of member 78A is between pins 14A, 14F. Portion 86 of member 78A is in bore 74A such that the movement of member 78A is restricted, as will be explained in more detail. Portion 82 of member 78B is between plunger 44 and pins 14B, 14C such that portion 82 of member 78B contacts surface 62 of the plunger 44 and the tapered portions 43 of pins 14B, 14C. Portion 88 of member 78B is between pins 14B, 14C. Portion 86 of member 78B is in bore 74B such that the movement of member 78B is restricted. Portion 82 of member 78C is between plunger 44 and pins 14D, 14E such that portion 82 of member 78C contacts surface 62 of the plunger 44 and the tapered portions 43 of pins 14D, 14E. Portion 88 of member 78C is between pins 14D, 14E. Portion 86 of member 78C is in bore 74C such that the movement of member 78C is restricted.

In the embodiment depicted, the body 12 of the clamp 10 also defines holes 90. Each hole 90 is opposite a respective one of holes 74A-C, and may facilitate maintenance of the clamp 10 by providing access to the locking members 78A-C.

Figure 5:
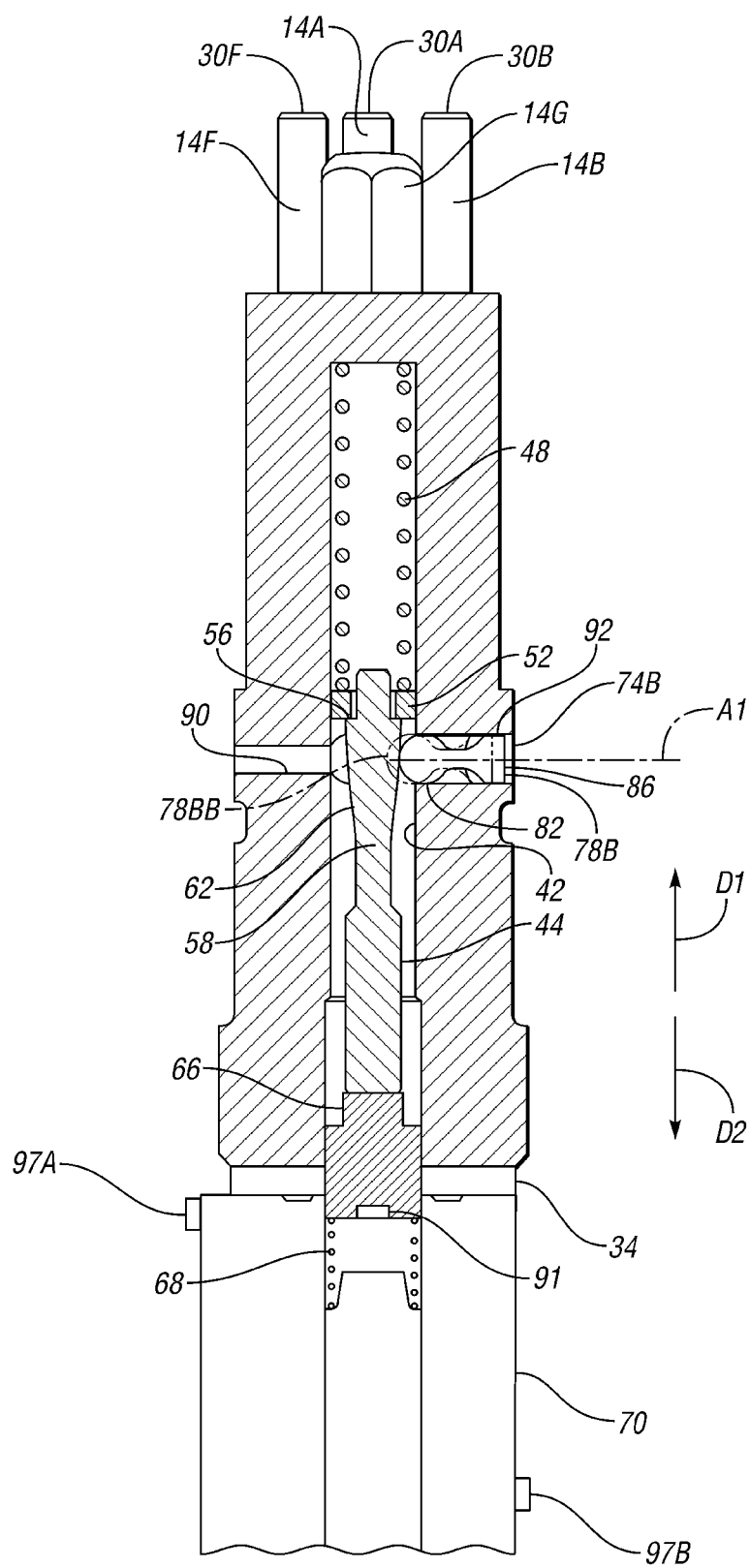
FIG. 5 is a schematic, longitudinal sectional side view of the clamp assembly of FIG. 1.

Referring to FIG. 5, bore 74B and locking member 78B are schematically depicted. Hole 74B is representative of holes 74A, 74C. Locking member 78B is representative of locking members 78A, 78C. The locking member 78B and the hole 74B are configured such that interaction between the body 12 and the locking member 78B prevents rotation of the locking member 78B with respect to the body 12 in at least two directions.

Referring to FIGS. 4 and 5, the polygonal portion 86 functions as a polygonal key, interacting with the body 12 inside hole 74B to prevent rotation of the member 78B about axis A1. That is, the perimeter 92 of the polygonal portion 86 interacts with the surface of the body 12 that defines the hole 74B such that the body 12 prevents the rotation of the locking member 78B about axis A1. A portion of the spherical portion 82 protrudes outward from the lateral hole 74B into the central bore 42 to contact surface 62 of the plunger 44. Another portion of the spherical portion 82 remains in the lateral hole 74B. The height of the lateral hole 74 is only marginally larger than the diameter of the spherical portion 82 and the height of the polygonal portion 86; thus the surface of the body 12 that defines the hole 74B also prevents rotation of the locking member 78B about axis A2. Axes A1 and A2 (see FIG. 4) are perpendicular to each other and are perpendicular to the first and second directions D1, D2. The surfaces of the body 12 that define hole 74B also prevent movement of the locking member 78B in either the first direction D1 or the second direction D2.

Referring again to FIGS. 2, 3, and 5, the spring 48 exerts a force on the plunger 44 in the second direction via the collar 52. The surface 62 of the plunger 44 is angled relative to the second direction D2 such that the plunger 44 transfers the force from the spring 48 to the spherical portions 82 of the locking members 78A-C. The force exerted on the spherical portions 82 by the surface 62 includes a lateral component, i.e., a component that is orthogonal to the first and second directions D1, D2, and that urges the spherical portions 82 away from the central bore 42 and into the tapered portions 43 of the pins 14A-F, thereby locking the pins 14A-F with respect to the body 12. Thus, the plunger 44 and the locking members, 78A-C, are part of a locking mechanism 93 (shown in FIGS. 6 and 7) that selectively prevents movement of the pins 14A-F relative to the body. Each locking member 78A, 78B is prevented from rotating about an axis that is parallel to the first and second directions D1, D2 by the surface 62 and two of the pins 14A-F acting thereon. Thus, in the embodiment depicted, the locking members 78A-C are prevented from rotating, and their movement is limited to lateral translation.

Figure 6:
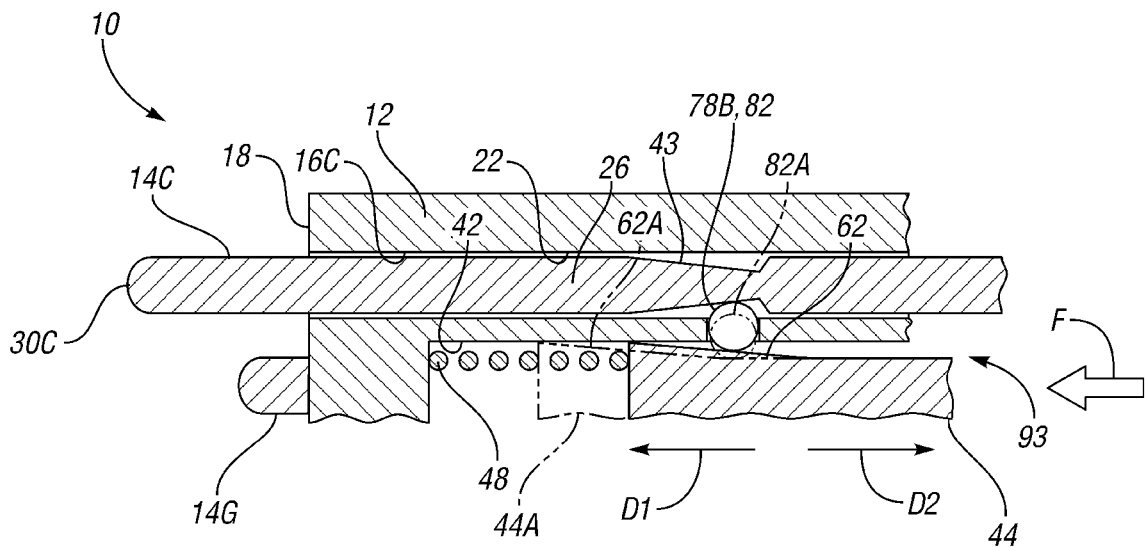
FIG. 6 is a schematic, fragmentary sectional view of the clamp assembly of FIG. 1 with one of the pins in a first position.
Figure 7:
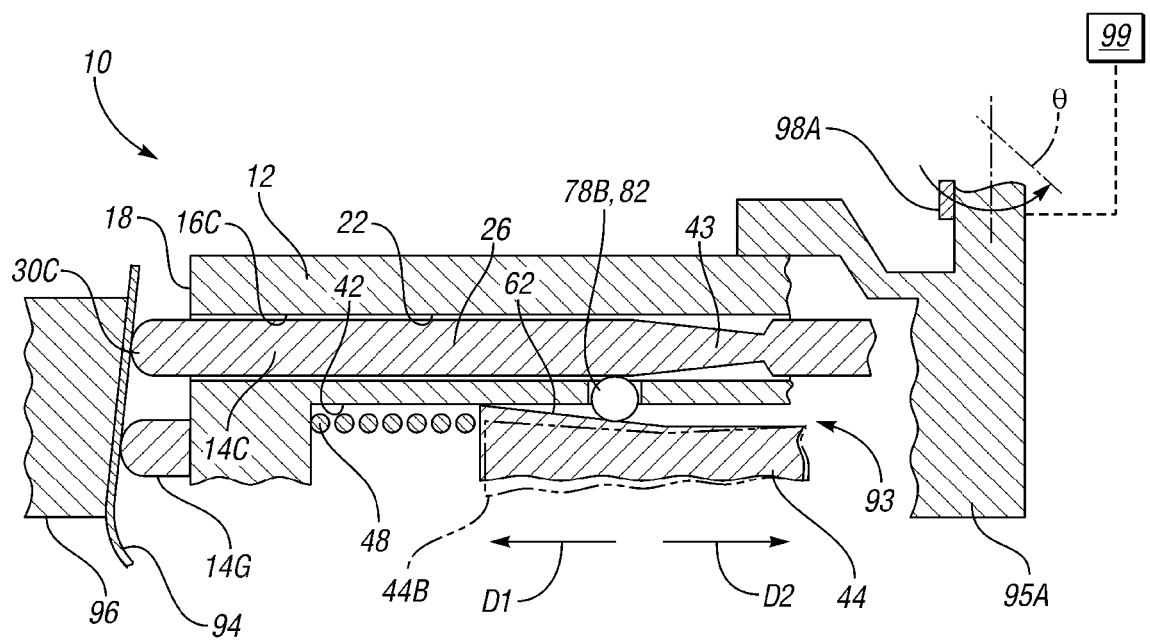
FIG. 7 is a schematic, fragmentary sectional view of the clamp assembly of FIG. 1 with the pin of FIG. 6 in a second position, and a moveable arm arranged to hold the clamp assembly.

The clamp 10 is reconfigurable; that is, the locking mechanism 93 is selectively releasable so that the positions of the pins 14A-F with respect to the body 12 are selectively variable. FIGS. 6 and 7 schematically depict operation of the locking mechanism 93 during reconfiguration of the clamp 10, i.e., during repositioning of the pins with respect to the clamp body 12. Although only pin 14C is shown in FIGS. 6 and 7, it should be noted that the interaction between pin 14C and the locking mechanism 93 is identical to the interaction between the other selectively movable pins 14A-B, 14D-F and the locking mechanism 93.

Referring to FIG. 6, pin 14C is shown in its extended position. Spring 48 urges plunger 44 in the second direction D2; in turn, surface 62 of the plunger 44 drives spherical portion 82 of locking member 78B outward and against the tapered portion 43 of pin 14C, thereby locking pin 14C with respect to the body 12. Friction between the spherical portion 82 of the locking member 78B and the pin 14C prevents movement of the pin 14C in the first direction D1. It should be noted that, in the embodiment depicted, the force exerted by the spring (shown at 32 in FIG. 3) is sufficient to overcome friction between the pin 14C and the body 12, but is not sufficient to overcome the friction between the locking member 78B and the pin 14C.

The pin 14C is prevented from moving in the second direction D2 due to friction between the locking member 78B and the pin 14C, and also because the tapered portion 43 is angled relative to the second direction D2 such that movement of the pin 14C in the second direction causes the locking member 78B to exert a reaction force on the pin 14C in the first direction.

It should be noted that other configurations of locking members may be employed within the scope of the claimed invention. For example, locking members 78A-C may be spherical balls (not shown). Due to being keyed to the body 12, the locking members 78A-C are restricted from rolling in a direction that may compromise their ability to lock the pins 14A-F with respect to the body 12.

To unlock the pin 14C, and thereby to permit translation of the pin 14C in either the first or the second direction D1, D2, the plunger 44 is moved in the first direction D1. More specifically, in the embodiment depicted, the actuator (shown at 70 in FIG. 5) exerts a force F on piston 66 (shown in FIGS. 3 and 5), which transmits the force to the plunger 44. The force F exerted by the actuator 70 is sufficient to overcome the bias of the spring 48, and the plunger 44 moves in the first direction to the position shown in phantom at 44A. Correspondingly, surface 62 moves in the first direction D1 to the position shown in phantom at 62A.

The taper of surface 62 is such that movement of the plunger 44 in the first direction D1 increases the distance between surface 62 and the tapered portion 43. Thus, locking member 78B is not tightly wedged between the surface 62 and the tapered portion 43 of the pin, thereby permitting relative movement of the pin 14C relative to the body 12. Thus, when the surface is at the position shown at 62A, the locking member 78B can move laterally, away from the pin 14C (and pin 14B) to the position shown in phantom at 78BB in FIG. 5; correspondingly, the spherical portion 82 of the locking member 78B moves laterally, further into the central bore 42, to the position shown in phantom at 82A in FIG. 6, where it does not contact the pin 14C, or, if contact occurs between the spherical portion 82 and the pin 14C, the friction therebetween is low.

Thus, movement of the member 44 to the position shown at 44A unlocks the pin 14C with respect to the body 12, and the pin 14C is selectively movable. Due to the fact that the clamp 10 is reconfigurable, the same clamp 10 can be used to handle objects of differing shapes or contours. In an exemplary use, the clamp 10 is employed by a robotic arm or other fixture to manipulate or hold sheet metal components for vehicle bodies.

Referring to FIG. 7, to reconfigure the clamp 10 for a particular sheet metal contour, a representative piece of sheet metal 94 is pressed against the tips 30A-F (only tip 30E shown) of the pins 14A-F when the pins 14A-F are unlocked, i.e., when the plunger 44 is in the position shown at 44A in FIG. 6. The axis of advance of the sheet metal part 94 should be such as to locate the point of contact between the fixed pin 14G and the sheet metal part 94 at a predetermined location on the sheet metal part 94, which is preferably a location of minimal local curvature. The sheet metal part 94 will continue to contact and displace the pins 14A-F until the sheet metal part 94 contacts the fixed pin 14G and the relative motion between the sheet metal part 94 and the clamp body 12 ceases. Preferably at the point when contact occurs between the sheet metal part 94 and the fixed pin 14G, the sheet metal part 94 will contact all of the plurality of movable pins 14A-F.

The sheet metal 94 will move each pin 14A-F in the second direction D2, against the bias of the springs shown at 32 in FIG. 3, to a respective position in which the tips 30A-F approximate the contour of the sheet metal 94. Thus, in FIG. 7, pin 14C has been moved in the second direction D2 by the sheet metal 94 from its extended position to the position shown in FIG. 7. It should be noted that the stationary pin 14G is used as a reference location capable of identifying the location of the clamped sheet metal 94 in the reference frame of the tooling and thus for specifying the operating location of the clamp 10.

After the pin 14C has been moved to the position shown in FIG. 7, then the actuator (shown at 70 in FIG. 5) is deactivated, and the spring 48 urges the plunger 44 in the second direction D2 until the plunger 44 is in the position shown in FIG. 7 and driving the spherical portion 82 of locking member 78B against pin 14C (and pin 14B), thereby to lock the pins 14C and 14B with respect to the body 12. It should be noted that the locking member 78B in FIG. 7 contacts tapered portion 43 at a wider portion of the tapered portion 43 in FIG. 7 than in FIG. 6; accordingly, the locking member 78B is closer to the centerline of bore 42 in FIG. 7 than in FIG. 6. Thus, once the pneumatic actuator is deactivated and the spring 48 moves the plunger 44 in the second direction D2, the locking member 78B prevents the plunger 44 from returning to its original position shown at 44 in FIG. 6. Since all three locking members 78A-C may move laterally as a result of pin movement, the plunger 44 is movable laterally, such as to the position shown at 44B, in order to find a location such that it acts on all three locking members 78A-C. Thus, the plunger 44 is not rigidly connected to the collar (shown at 52 in FIG. 3) or to the piston (shown at 66 in FIGS. 3 and 5).

It should be noted that the locked condition is achieved through the urging of plunger spring 48, without the need for any action of the actuator (shown at 70 in FIG. 5). Thus the locking action may be achieved without the application of external power to the reconfigurable clamp 10. Hence the reconfigurable clamp 10 maintains its geometry even in the case of a power failure which incapacitates the external source of power. The locking members 78A-C may be hardened to limit deformation during stress. In an exemplary embodiment, springs (not shown) may be used to bias the locking members 78A-C into contact with surface 62 of the plunger 44. The springs shown at 32 and 48 are depicted as compression coil springs; however, those skilled in the art will recognize other spring configurations that may be employed within the scope of the claimed invention. In an exemplary embodiment, the springs 32, 48 are plunger springs. Pin 14G is depicted as a member attached to the body 12; however, within the scope of the claimed invention, the pin 14G may be part of the body 12.

In the above description it has been assumed that the transfer of the shape of the sheet metal part 94 to be supported and the clamp 10 is achieved through contact between the sheet metal part 94 and the reconfigurable clamp 10. Alternatively, a solid block into which a representation of the relevant section of the sheet metal part 94 has been rendered may also be used. Such a procedure may be desirable if it is desired to set the form of the reconfigurable clamp 10 off-line and bring it to the operating location with the shape already preset.

Alternatively, the tapered portions 43 on the movable pins 14A-F may be oriented such that the diameters of the tapered portions 43 increase in the second direction D2, instead of in the first direction D1 as shown. Similarly, the tapered portion 58 on the plunger 44 may be oriented such that the diameter of the tapered portion 58 increases in the second direction D2, instead of in the first direction D1 as shown.

As shown in FIG. 7, a moveable arm 95A is arranged to hold the clamp 10. The moveable arm 95A is capable of translating or rotating through an angle θ for bringing the clamp 10 into contact with sheet metal part 94. A clamping device 96 may be used to trap the clamped sheet metal part 94 between the clamping device and the clamp 10 (shown in FIG. 7). The clamping device 96 may be a stationary tool specially shaped or having a compliant member to conform to the underside of the sheet metal part 94, or a second reconfigurable clamp. Alternately, a moveable arm 95B may be employed to act opposite either a stationary or a moveable clamp 10 to trap the clamped sheet metal part 94 between the moveable arm and the clamp (shown in FIG. 8). Furthermore, both moveable arms, 95A and 95B, may be employed for clamping and holding sheet metal part 94.

Figure 9:
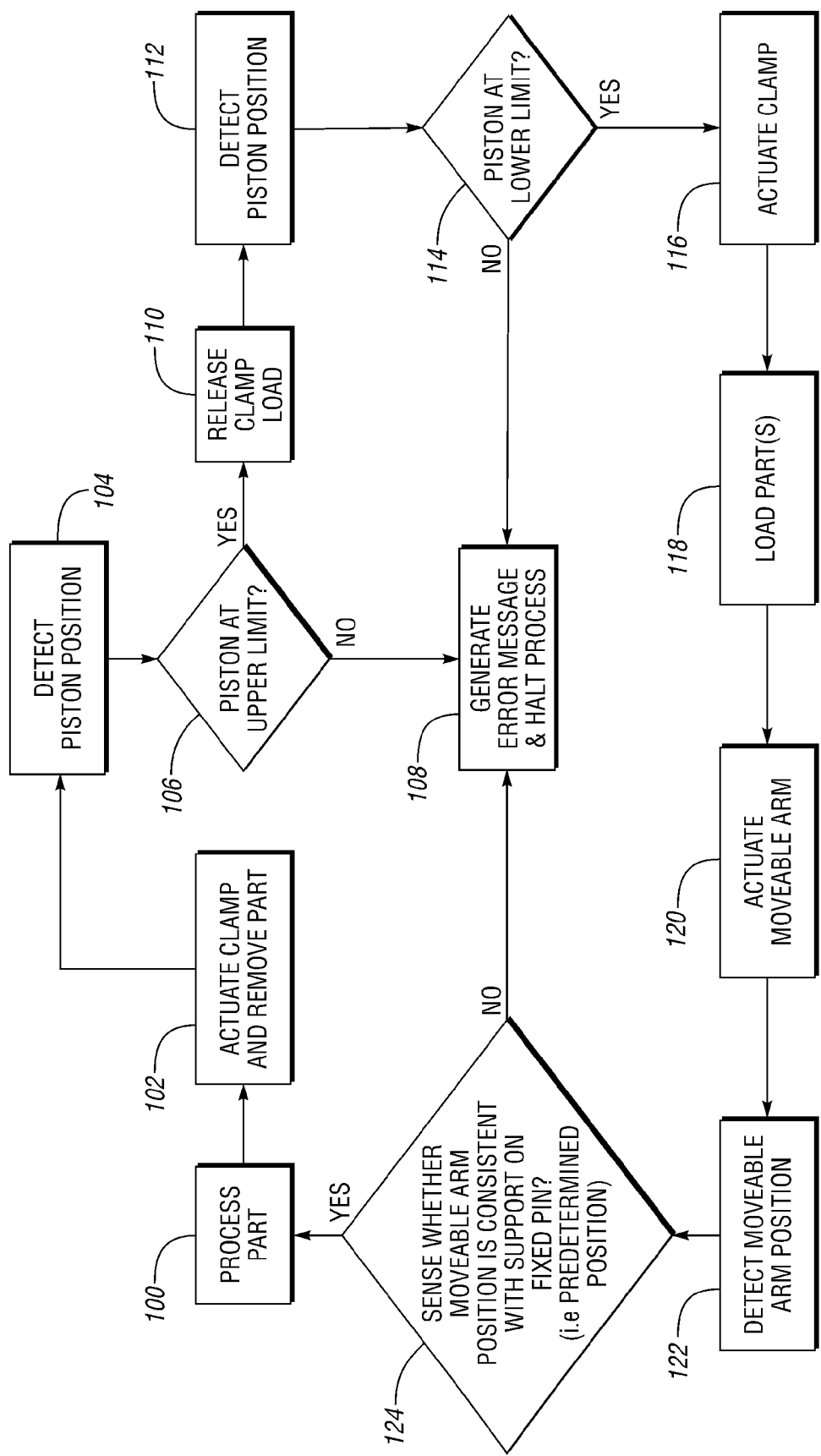
FIG. 9 is a flow chart illustrating a method for carrying out the clamp error-proofing.

A sequence of operations of the clamp 10 for carrying out the clamp error-proofing method is described below, and is best followed by reference to FIG. 9. As described above, the interaction between pin 14C and the locking mechanism 93 (shown in FIGS. 6 and 7) is identical to the interaction between the other selectively moveable pins 14A-B, 14D-F and the locking mechanism 93. During operation of the clamp, an accumulation of debris or foreign particles in the clamp pin bores 16A-E (shown in FIG. 2), a pin, or multiple pins may jam inside their respective bores, preventing pin movement relative to the body 12, thereby disabling the clamp. Additionally, the clamp 10 may become disabled due to the plunger 44 becoming jammed with respect to the body 12. The error-proofing method is therefore configured to identify these possibilities, set an error message alerting of the malfunction and put halt to continued clamp operation.

Figure 8:
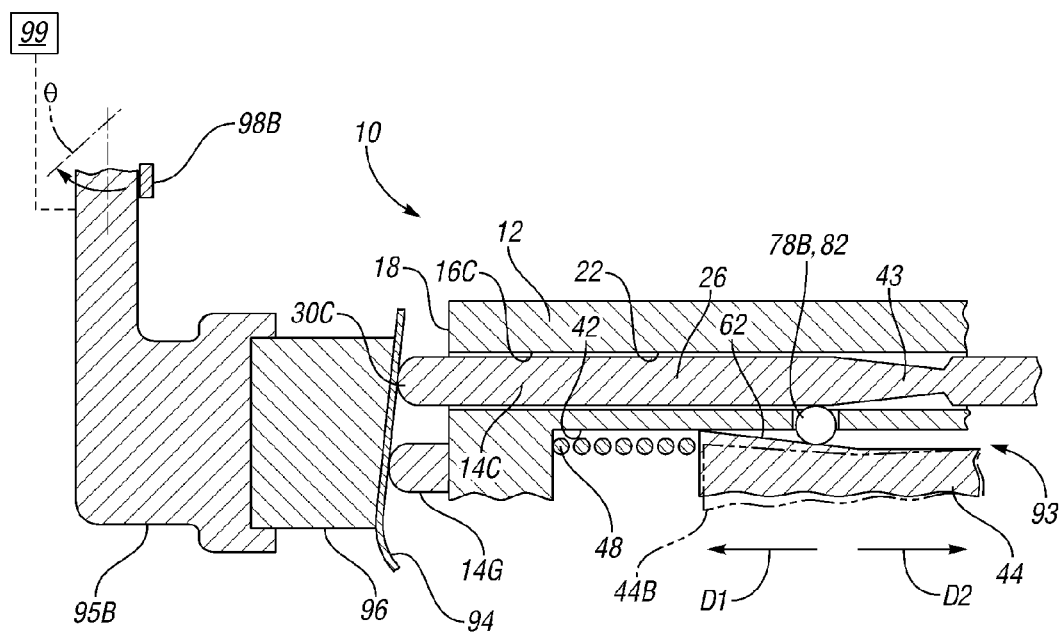
FIG. 8 is a schematic, fragmentary sectional view of the clamp assembly of FIG. 1 with the pin of FIG. 6 in a second position, and a moveable arm arranged to hold a clamping device.

The error-proofing commences in block 100 with the sheet metal part 94 being held between the clamp 10 and the clamping device 96, as shown in FIG. 7. In block 102 the clamp 10 is actuated to unlock the pins 14A-F, and the moveable arm 95A of FIG. 7, or arm 95B of FIG. 8, is retracted in order to release the sheet metal part 94. To facilitate removal of a sheet metal part 94, the force F is applied to the plunger 44, and the pins 14A-F are urged to achieve their fully-extended position, as the sheet metal part is separated from the clamp 10. As shown in FIG. 6, the load F drives the plunger 44 against the action of the plunger spring 48 in the first direction D1. The spring 48 is thereby compressed, and the tight wedging contact between the locking member 78B and the plunger 44 is released. Thus applied, the load F substantially concurrently also releases the tight contact between the plunger 44, the locking members 78A-C and the pins 14A-F (shown in FIG. 2). The release of the tight wedging contact in turn enables the pin 14C, as well as the pins 14A-B and 14D-F, to return to their fully-extended position under the urging of the springs 32. Following the release and removal of the sheet metal part 94, the method proceeds to block 104, where the position of the plunger 44 is determined.

The position of the plunger 44 may be inferred by sensing position of the piston 66 via non-contact magnetic sensors 97A and 97B, such as reed switches, mounted externally on the actuator 70 (shown in FIG. 5). A complementary magnet 91 is mounted on the piston 66 (see FIG. 5), to trigger the appropriate signal. Alternately, the plunger's position may be sensed or detected directly, by locating a sensor on the piston 66 (not shown), however, a typical sensor necessarily positioned on the plunger 44 to affect such direct detection may lead to packaging concerns inside the clamp 10.

Position of piston 66 may be used to successfully infer position of the plunger 44, because, generally, the piston 66 will remain in contact with the plunger 44 as a result of clamp internal friction, which is inherent to devices with moving parts. Due to such friction, when load F is released, actuator 70 typically retracts, i.e. travels in the D2 direction, until it loses contact with piston 66, thus avoiding possibility that the plunger 44 may be prevented from adopting a pins-locked position. Because piston 66 can be expected to remain in contact with the plunger 44 during clamp operation, the position of the plunger 44 may be directly correlated to positioning of the piston 66. If more certainty regarding consistency of contact between the plunger 44 and the piston 66 is required, a light spring 68, weaker than the spring 48, may be installed between the piston 66 and the actuator 70, as shown in FIG. 5. The spring 68 will therefore urge piston 66 into contact with plunger 44 without displacing the plunger in direction D1 until force F is applied by the actuator 70.

In block 104, with the force F still being applied, whether a pin or pins 14A-F are stuck in a depressed position is established based on whether the plunger 44 has achieved its fully-depressed position, i.e. its limit of travel in direction D1. Generally, if a pin or pins get stuck in a depressed position, the plunger's ability to achieve its fully-depressed position will be impeded. Whether the plunger 44 has achieved its fully-depressed position can be inferred from whether the piston 66 has achieved its extension upper limit, i.e. position of the piston at the limit of its travel in direction D1, because the piston's extension limit necessarily corresponds to the fully-depressed position of the plunger. The position of piston 66 is determined by sensor 97A mounted on the actuator 70 (see FIG. 5), of the type described above.

In block 106, an inquiry is made whether a pin or pins 14A-F are stuck in a depressed position, thereby locking the plunger 44 short of its fully-depressed position, based on whether the piston 66 has achieved its extension upper limit. If in block 106 a determination is made that the piston 66 has not reached its extension limit, and therefore that the plunger 44 has not achieved its fully-depressed position, the method proceeds to block 108. In block 108 the fact that the piston 66 has not reached its extension limit is treated as a fault, which is used to trigger an error message and halt continued clamp operation.

If in block 106 the piston 66 was determined to have achieved its extension limit, the method proceeds to block 110. In block 110 the pneumatic actuator 70 is depressurized, thereby releasing the load F on the clamp 10. The release of load F enables the compressed plunger spring 48 to expand and drive the plunger 44 to reestablish the tight wedging contact between the plunger 44, the locking members 78A-C and the pins 14A-F, thereby locking the pins 14A-F into position. When load F is released, piston 66 typically retracts while remaining in contact with plunger 44 due to either the friction within actuator 70 or as a result of the force applied by spring 68.

After the sheet metal part 94 has been removed from clamp 10 and the clamp has been depressurized, if none of the pins have jammed, the locking members 78A-C will be displaced by outer surface 62 of the tapered portion of plunger 44. Thus displaced, locking members 78A-C will in turn permit the spring 48 to drive the plunger 44 to its fully-extended position. As a consequence, the plunger 44 will displace the piston 66 in the direction D2 to a retracted limit as dictated by the mechanical interference of the plunger 44 with the body 12. Following the release of the load F, the method proceeds to block 112.

In block 112 position of the piston 66 is again detected. If one or more pins 14A-F get jammed in a depressed position, free movement of one or more locking members 78A-C will be obstructed. Thus, when the force F is released, the obstructed locking members 78A-C will lock the plunger 44 in an intermediate position, i.e. prevent the plunger from achieving its fully-extended position. As a consequence of the plunger being locked, even though the force F has been released, the piston 66 will fail to achieve its retracted limit, i.e. position of the piston at the limit of its travel in direction D2 (not shown). Hence, because position of the plunger 44 correlates to position of the piston 66, in block 112 position of the piston is detected via sensor 97B (see FIG. 5), of the type described above, and the position of the plunger is inferred from that result. The method then proceeds to block 114.

In block 114, whether the plunger 44 has achieved its fully-extended position is ascertained by inquiring whether the piston 66 has achieved its retracted limit. If the piston 66 has not achieved its retracted limit, the method proceeds to block 108. In block 108, the fact that the piston 66 has not achieved its extension limit is treated as a fault, which is used to trigger an error message and halt continued clamp operation.

If a pin or pins get jammed in or near their fully-extended position, thereby locking the plunger 44 near its fully-extended position, a simple limit switch, such as described above, may not be sufficiently sensitive to reliably sense, i.e. detect, the fault. To address this concern, a more sensitive, i.e. precise, sensor capable of continuous output as a function of position, such as, for example, a Linear Variable Differential Transformer (LVDT) may be employed. In the alternative, an approach permitting plunger 44 position to be correlated to the angle θ that the moveable arm 95A (see FIG. 7) or 95B (see FIG. 8) must travel to clamp a sheet metal part, may then be used. Such an alternative will be described in greater detail in connection with method blocks 120-124.

A clamp malfunction may also be the result of a jammed plunger 44. Generally, it is inconsequential whether the plunger 44 has jammed because a stuck pin or pins locked one of the locking members 78 to the plunger, or whether just the plunger itself jammed with respect to the body 12. Detection of a plunger 44 that has jammed in absence of a concomitant jamming of the pins will still be detected by using the sensor 97A, since piston 66 will fail to achieve its extension limit when acted on by actuator 70. However, if a separate identification of such fault is desired, a stuck plunger may be detected by incorporating an additional limit switch (not shown) into the piston 66 to sense whether the piston 66 has achieved its extension limit while under load F. The contemplated additional limit switch may be a magnetic reed switch or an optical sensor, as described above in connection with blocks 104 and 112. Hence, a fault may be sensed whether the plunger 44 fails to achieve its fully-extended position under load F, or if the plunger fails to return to its fully-depressed position when the load F is released. As noted above, however, the fact that failure of the plunger 44 to achieve its fully-extended position may occur due to a problem with the plunger or with the pins 14A-F is immaterial; in either situation an error message should be generated and the clamp operation should be halted. If in block 114 the piston 66 was determined to have achieved its retracted limit, the method proceeds to block 116.

In block 116 the clamp 10 is actuated by reapplication of the force F to plunger 44 via piston 66. The method then proceeds to block 118, where a new sheet metal part 94, substantially similar to the original sheet metal part 94, is loaded for handling by the clamp 10. The new sheet metal part 94 is brought into contact with the pins 14A-F, thereby urging the pins in direction D2 (as representatively shown by the pin 14C in FIG. 7). The new sheet metal part 94 is thus utilized to drive, i.e. depress, the pins into the clamp body 12 until the sheet metal contacts the fixed pin 14G. Once the relative motion between the body 12 and the new sheet metal part 94 ceases, the pin tips 30A-F, as represented by the tip 30C in FIG. 7, conform to the contour of sheet metal surface. Following the loading of the new sheet metal part, the method proceeds to block 120.

In block 120 the moveable arm 95A (see FIG. 7), or the moveable arm 95B (see FIG. 8), is actuated to trap the new sheet metal part 94 between the clamp 10 and the stationary feature 96. Regardless of whether the clamping is performed by employing the moveable arm 95A or the moveable arm 95B (see FIG. 8), relative motion between the clamp 10 and the sheet metal part ceases when the clamped sheet metal part contacts the fixed pin 14G. If a moveable pin 14A-F is stuck in or near its fully-extended position, the clamped sheet metal part will be supported by the stuck pin at a position beyond the fixed pin 14G. As a consequence, if the clamped part is supported by the stuck pin, the moveable arm 95A or 95B will not need to rotate, or travel as far through the angle θ as it would if the fixed pin 14G set the position of the clamp 10. Hence, sensing the travel of moveable arm 95A or 95B via a rotary sensor 98A (see FIG. 7) or 98B (see FIG. 8), respectively, would allow detection of a difference between an arm's position when a stuck pin sets the clamp position and a predetermined position when the clamp position is set by the pin 14G.

The sensing of travel of the moveable arm 95A or 95B will be most responsive to pins stuck in or near their fully-extended position, i.e. the condition where the piston 66 mounted sensor is likely to be least effective. Therefore, sensing travel of the moveable arm 95A or 95B complements having a sensor mounted on the piston 66, as described in connection with blocks 104 and 112 above, in determining whether any of the pins 14A-F have jammed. Following the actuation of the moveable arm 95A or 95B, the method proceeds to block 122.

In block 122 the position of the moveable arm 95A or 95B is detected. The method then proceeds to block 124. In block 124 a determination is made whether the moveable arm 95A or 95B has reached its predetermined position, and hence whether any of the pins 14A-F have jammed near their fully-extended position. If in block 124 a determination is made that the moveable arm has not reached its predetermined position, the method again proceeds to block 108, where the sensed fault is used to trigger an error message and a halt to continued clamp operation. The error message triggered in block 108 may be shown on a display screen (not shown) arranged in electronic communication with a controller 99 (shown in FIGS. 7 and 8), employed to control the clamping operation.

The disclosed error-proofing method is therefore capable of timely determining whether the spring-loaded lockable pins stick or jam due to accumulation of wear debris or other foreign particles inside the clamp mechanism. Thus determined, the fault is used to trigger an error message and halt the clamp operation in order to prevent possible damage to a handled sheet metal part.

While the best modes for carrying out the invention have been described in detail, those familiar with the art to which this invention relates will recognize various alternative designs and embodiments for practicing the invention within the scope of the appended claims.

The invention claimed is:

1. A method for error-proofing clamping operation performed with a reconfigurable clamp selectively operated for holding and releasing an object having a contour between the clamp and a clamping device, the method comprising:

providing the clamp having a body that defines a plurality of elongated bores, a locking member, a plurality of pins, each pin contained at least partially within the respective one of the plurality of bores and selectively moveable with respect to the respective one of the plurality of bores for contacting the object, and a plunger selectively moveable with respect to the pins, with respect to the locking member, and with respect to the body between a fully-extended position and a fully-depressed position for urging the locking member against at least one of the pins;

applying a force to the plunger and sensing whether the plunger achieves the fully-depressed position;

releasing the force applied to the plunger and sensing whether the plunger achieves the fully-extended position; and communicating the sensed positions to an interface device.

2. The method of claim 1, further comprising reapplying the force to the plunger to thereby enable contacting the object with the plurality of pins, and sensing whether the clamp body achieves a predetermined position relative to the clamping device.

3. The method of claim 2, wherein the clamping device comprises a moveable arm, and the predetermined position of the clamp body relative to the clamping device is determined with respect to a position of the moveable arm.

4. The method of claim 2, wherein the clamp is mounted on a moveable arm, and the predetermined position of the clamp body relative to the clamping device is determined with respect to a position of the moveable arm.

5. The method of claim 2, further comprising generating an error message and halting the clamp operation if:
   i) the plunger does not achieve the fully-depressed position;
   ii) the plunger does not achieve the fully-extended position; or
   iii) the clamp body does not achieve the predetermined position relative to the clamping device.

6. The method of claim 1, wherein the sensing whether the plunger achieves the fully-depressed position is performed via a limit switch.

7. The method of claim 1, wherein the sensing whether the plunger achieves the fully-extended position is performed via a limit switch.

8. The method of claim 1, wherein the sensing is whether the plunger achieves the fully-depressed position performed via an optical sensor.

9. The method of claim 1, wherein the sensing is whether the plunger achieves the fully-extended position is performed via an optical sensor.

* * * * *